Patented Apr. 15, 1930

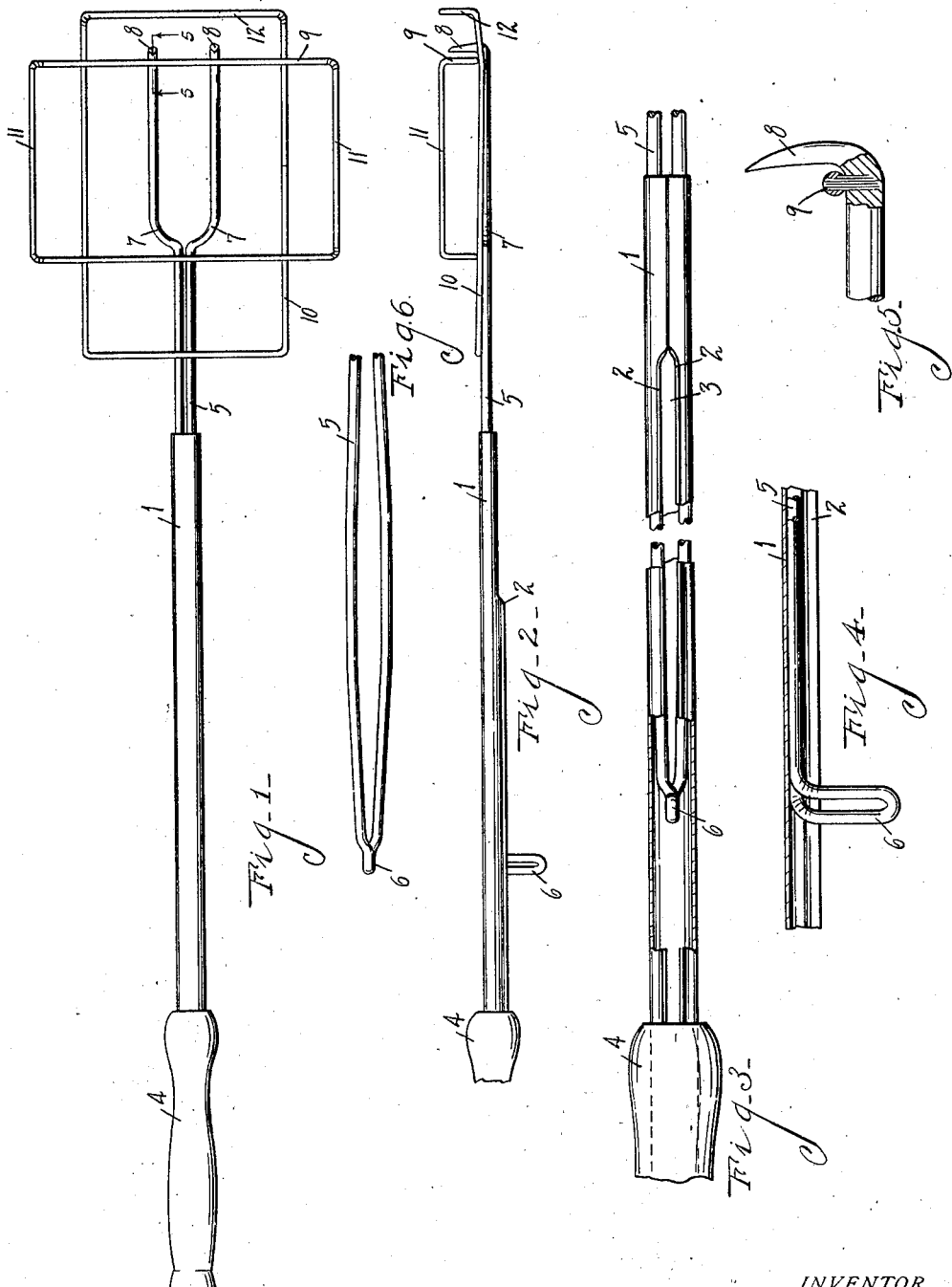

1,754,968

UNITED STATES PATENT OFFICE

BENJAMIN H. SMITH, OF NILES, MICHIGAN, ASSIGNOR TO MICHIGAN WIRE GOODS COMPANY, OF NILES, MICHIGAN

KITCHEN AND CAMP IMPLEMENT

Application filed September 3, 1929. Serial No. 390,140.

The main objects of this invention are:

First, to provide an improved kitchen or camp implement well adapted for broiling, toasting and the like.

Second, to provide an extension handle for implements of the class described which may be of considerable length when extended, is very easily manipulated and is frictionally retained in its adjusted position.

Objects pertaining to details and economies of my invention will definitely appear from the description to follow. The invention is defined in the claims.

A structure which embodies the features of my invention is clearly illustrated in the accompanying drawing, in which:

Fig. 1 is a plan view of a broiling and toasting implement embodying the features of my invention.

Fig. 2 is a side view thereof, a portion of the handle grip being broken away.

Fig. 3 is a fragmentary inverted view.

Fig. 4 is a fragmentary view, the shank being shown in central longitudinal section.

Fig. 5 is an enlarged fragmentary view on line 5—5 of Fig. 1.

Fig. 6 is a fragmentary view showing details of the shank.

Referring to the drawing, the implement illustrated is designed as a toaster or broiler, mainly for camp purposes. The tubular handle 1 is formed of a piece of sheet metal rolled to provide a flattened tube, portions of the edges being turned downwardly at 2 to provide a longitudinal slot 3. The handpiece 4 of wood is arranged on the end of the handle member 1. This handpiece closes the inner end of the slot and the outer end is also closed as shown in Fig. 3.

The shank 5 telescopes into the handle and is formed of a piece of wire folded upon itself to provide a spring loop, that is, the arms of the shank are outwardly bowed as illustrated in Fig. 6 so that when telescoped within the handle the shank frictionally engages the same, retaining the shank in its adjusted position. The bight end of the shank is turned laterally to provide a finger piece 6 which is given a quarter twist and disposed through the slot 3 to project below the handle. This arrangement permits ready adjustment of the handle. The arms of the shank are oppositely offset at 7 and terminate in upwardly projecting sharpened prongs 8.

The rectangular frame-like holder member 9, also formed of wire, is arranged transversely of the shank with one of its side members adjacent the prongs and secured to the arms of the shank, its other side member being disposed adjacent the offsets of the shank.

A second frame-like holder member 10 is arranged transversely of the member 9 and secured thereto. The ends 11 of the holder member 9 are upwardly offset and the outer end 12 of the member 10 is also upwardly offset and lies in spaced relation to the prongs 8. I thereby secure a grid-like holder with upwardly projecting side and front parts and upwardly projecting prongs serving to anchor the meat to be broiled, bread to be toasted, or the like.

I have not attempted to illustrate other embodiments or adaptations of my improvements as it is believed that this disclosure will enable those skilled in the art to embody or adapt the same as may be desired.

Having thus described my invention what I claim as new and desire to secure by Letters Patent is:

1. In an implement of the class described, the combination with a tubular handle of flattened cross section provided with a hand piece at its outer end and having a longitudinal slot in its under side closed at its end, of an implement provided with a shank telescoping within the handle, said shank being formed of a piece of wire folded upon itself to provide a laterally resilient loop whereby it is frictionally supported in its adjusted positions within the handle, the bight end of the shank being turned laterally and given a quarter twist to provide a finger piece projecting through said slot in said handle.

2. In an implement of the class described, the combination with a tubular handle of flattened cross section provided with a hand piece at its outer end and having a longitudinal slot in its under side closed at its end, and an implement provided with a shank telescoping within the handle, said shank being formed of a piece of wire folded upon itself to provide a laterally resilient loop whereby it is frictionally supported in its adjusted positions within the handle, the bight end of the shank being disposed laterally to project through said slot in said handle providing a finger piece.

3. In an implement of the class described, the combination of a tubular handle having a longitudinal slot therein, and an implement provided with a loop-like shank formed of wire folded upon itself and arranged in telescoping frictional engagement within said shank, the bight end of said shank being disposed at an angle and having a quarter twist to project through said slot to provide a finger piece.

4. In an implement of the class described, the combination of a tubular handle having a longitudinal slot therein, and an implement provided with a loop-like shank formed of wire folded upon itself and telescoping within said shank, the bight end of said shank being disposed at an angle to project through said slot to provide a finger piece.

5. In an implement of the class described, the combination of a tubular handle having a longitudinal slot in one side thereof, and an implement provided with a loop-like shank formed of wire folded upon itself and telescopingly arranged within said handle with the members thereof under compression whereby the shank is frictionally held in its adjusted positions, the bight end of the shank being turned laterally to provide a finger piece projecting through said slot.

6. An implement of the class described comprising a shank member formed of wire folded upon itself, the ends of the arms of the shank member being oppositely offset and terminating in upwardly projecting prongs, a frame-like holder member having upwardly offset ends disposed transversely of said shank member and secured thereto with one side piece adjacent the prongs and the other adjacent the offsets of the arms, and a second frame-like member disposed transversely of the first-mentioned frame-like member and secured thereto, said second member having its outer end upwardly offset and lying in spaced relation to the prongs.

7. An implement of the class described comprising a shank member formed of wire folded upon itself, the ends of the arms of the shank member being oppositely offset and terminating in upwardly projecting prongs, and a frame-like holder member having upwardly offset ends disposed transversely of said shank member and secured thereto with one side piece adjacent the prongs and the other adjacent the offsets of the arms.

8. In an implement of the class described, a tubular handle of flattened cross section having a longitudinal slot in the underside thereof, and an implement provided with a loop-like shank formed of wire folded upon itself with its members spaced and supported in spaced relation slidably engaged within said handle under spring tension, said shank having a finger piece in its inner end disposed through said slot.

In witness whereof I have hereunto set my hand.

BENJAMIN H. SMITH.